Jan. 11, 1949.  C. F. KETTERING ET AL  2,458,784
AUTOMATIC CONTROL
Original Filed April 7, 1944  2 Sheets—Sheet 2

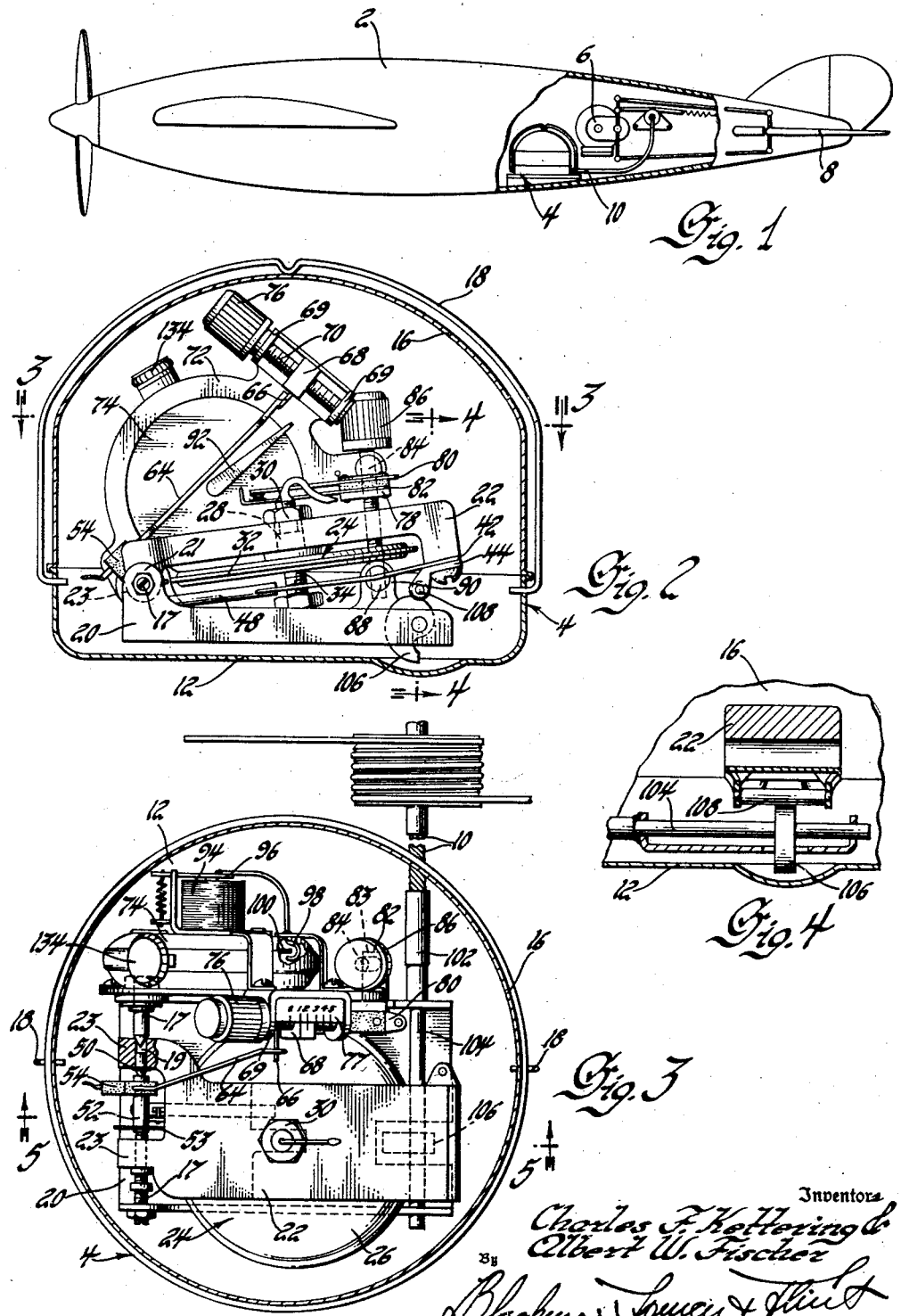

Inventors
Charles F. Kettering &
Albert W. Fischer
By Blackmore, Spencer & Flint
Attorneys Patented Jan. 11, 1949

2,458,784

UNITED STATES PATENT OFFICE 2,458,784

AUTOMATIC CONTROL

Charles F. Kettering and Albert W. Fischer, Detroit, Mich., assignors to General Motors Corporation, Detroit, Mich., a corporation of Delaware Original application April 7, 1944, Serial No. 529,990. Divided and this application September 28, 1945, Serial No. 619,118

10 Claims. (Cl. 318—489)

This invention relates to control means and more specifically to automatically operating control means which can be adjusted and preset to operate at different atmospheric pressures and is a division of S. N. 529,990 filed April 7, 1944, now Patent 2,456,198, issued December 14, 1948. There are many instances in which under certain desired conditions it may be necessary to operate certain controls, namely, such instances where for safety purposes certain switches must be closed upon atmospheric or other pressures reaching either too high or too low a value. There are other instances of the same import wherein it is desired to close switches depending upon atmospheric pressure changes and as one example of this may be mentioned aircraft which are designed to be flown either entirely alone without manual control or by radio control from some distant point, in such equipment as aerial torpedoes for example. In the latter case it would be necessary to provide some means for causing the torpedo to climb to a certain altitude, and when it reached the latter, level off and fly for a predetermined time or distance.

It is therefore an object of our invention to provide pressure-responsive means for controlling the rate of climb of an aircraft.

It is a further object of our invention to provide presettable means for controlling the rate of climb of an aircraft and also the elevation at which the latter is designed to level off for distant flight.

It is a still further object of our invention to provide pressure-responsive means actuatable by atmospheric pressure for controlling the rate of climb of an aircraft which may be adjusted.

With these and other objects in view which will become apparent as the specification proceeds, the embodiments of our invention will be best understood by reference to the following specification and claims and the illustrations in the accompanying drawings, in which:

Figure 1 shows a side elevation partly in section of an aerial torpedo in which our control or pressure-responsive device is mounted;

Figure 2 shows an enlarged vertical section through the control mentioned above;

Figure 3 is a sectional view of the control taken on line 3—3 of Figure 2;

Figure 4 is a partial section of a portion of the control taken on line 4—4 of Figure 2;

Figure 5:
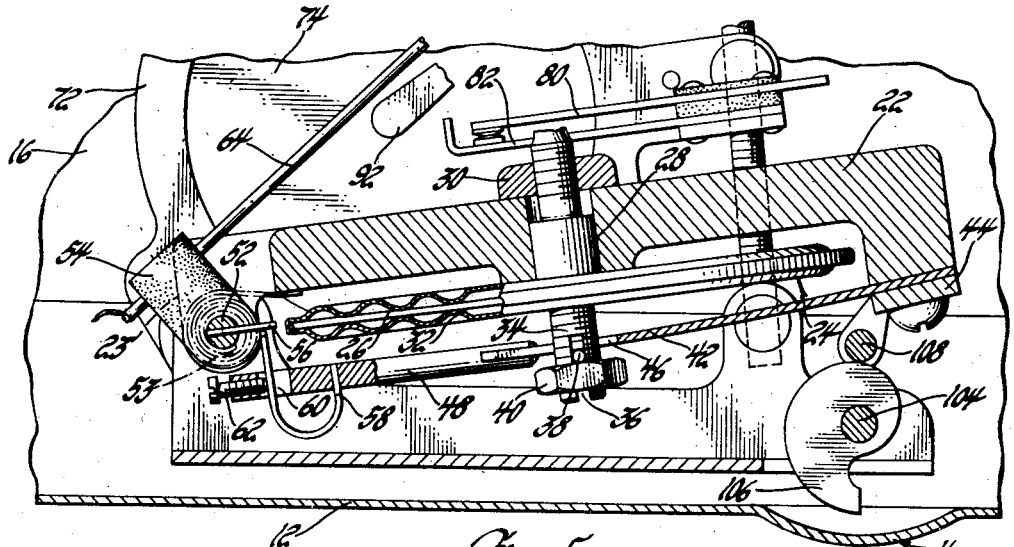
Figure 5 is a still further enlarged vertical section taken on line 5—5 of Figure 3.

Referring now more specifically to the drawings, there is shown in Figure 1 an aerial torpedo 2 having mounted therein an altitude control, indicated generally at 4, which controls an elevator motor 6 for varying the position of the elevators 8 and to which is connected a feed-back or follow-up means 10. The altimeter or altitude controlling means consists of a casing formed of two parts 12 and 16, the upper portion being of drum-shape and being held upon the lower part by a bent spring 18 passing over the top and removable for inspection or adjustment of the interior parts. A mounting plate 20 is provided in the lower part of the casing. This plate has adjacent one end upstanding ears 21 through which pointed horizontal mounting screws 17 pass to project into openings 19 in ears 23 of a pivotally mounted plate 22 so that the same may be secured in hinged relation thereto.

Pivotally mounted plate 22 has secured to its under-surface an aneroid pressure element 24 which is the operating element of our device. Secured to the upper face 26 of the aneroid element is a hollow stud 28, the upper surface of which is threaded and extends above the upper surface of the pivoted plate 22, and being locked thereto by nut 30. The extension on the hollow stud provides a connection for exhausting the air therefrom. In alignment with the stud 28 and extending from the lower surface 32 of the aneroid pressure element is a second operating threaded stud 34 having a central diametral slot 36 therein which is adapted to carry a transverse pin 38 whose vertical position may be adjusted by a nut 40 threaded on the stud.

Across the bottom of the aneroid bellows extends a composite element, half of which is formed of a flat spring member 42, one end of which is clamped as shown at 44 to the outer end of the pivoted member 22 and which has a central slot 46 straddling the stud 34, and the opposite end of which is rigidly secured to rod 48 which extends to a position approximately under the pivot of the member 22. Mounted on the ears 23 and in the openings 19 are pointed pins 50 which project toward each other and pivotally support therebetween a short shaft 52 which may be readily rotated on these pivot points. On this shaft is frictionally mounted a lever 54 of electrically insulating material in operatively non-rotating relation with respect to the shaft. An axially spaced pin 56 extends through the shaft and is secured thereto.

The inner end of the rod 48 carries therein a U-shaped spring member 58, one end of which is secured in a transverse opening in the rod and the other leg proceeds up through an adjacent slot 60 in the rod and may have its axial position altered by an adjusting screw 62 threaded therein. The upper end of this spring member 58 is adapted to contact the extending end of the pin 56 whereby any vertical movement of the inner end of the rod 48 will cause the stub shaft 52 to be rotated. The shaft 52 is spring biased by convolute spring 53. Since the leaf spring 42 normally causes this member to assume its lowest possible position, this position will be determined by the transverse pin 38 and therefore by the condition of the aneroid pressure element 24.

The lever 54 has extending through its outer end one end of a rod 64 which is supported thereby and extends up into engagement with an adjustable contact 66. This contact 66 is in the form of a pin projecting from a traveling nut 68 on a threaded shaft 70 which is supported in flanged ears 69 on an extension from a substantially circular pivotally mounted member 72 which also supports a clock or other time mechanism 74. The threaded shaft 70 extends through the upper ear 69 and carries at the upper end a knurled head 76 for manual adjustment of the traveling nut 68. An indicating scale 77 calibrated in feet elevation is provided to permit setting. Supporting means 72 also is provided with a substantially horizontal platform 78 which carries a pair of switch arms 80 and 82 whose purpose will be later described.

Projecting in the opposite direction from the rear face of the same portion is a similar platform 83 which supports a substantially vertical threaded shaft 84 having a manual engageable knurled head 86, the lower portion of which is rotatably mounted in a short stub shaft 88 in an upstanding ear 90 on the supporting plate 20 so that when the head 86 is turned, the position of the vertical mounting plate 72 with respect to the horizontal mounting plate 20 may be adjusted about an axis approximately in alignment with shaft 52. There is provided also on the face of the time mechanism an arm 92 adapted to be rotated by the same and to engage the end of arm 64 and also switch arm 82 and open the switch provided by the two arms 80 and 82 under certain conditions.

On the rear face of the timing mechanism there is mounted a control solenoid 94 to whose armature 96 is secured a locking mechanism 98 adapted to control the operation of the time mechanism by engagement with an operating wheel 100 thereof. There is also provided a follow-up mechanism whereby if the control calls for a change in the position of the elevators or other controlled equipment, the operation of the motor 6 to provide this variation will at the same time alter the position of the aneroid mount with respect to the control mechanism and prevent overtravel. This follow-up is provided through flexible transmission cable 10 which has its inner end swedged into a collar or coupling 102, which is in turn connected to a rotatable rod 104 having thereon a cam 106. This cam is adapted to engage a roller 108 secured to the forward undersurface of the pivoted platform or plate 22, this latter construction being best shown in Figure 4.

Thus, any change in the atmospheric pressure, and therefore in the pressure element 24, will cause the stud 34 to be moved, permitting the rod 48 to move up or down depending upon the pressure change which through the spring 58, pin 56, shaft 52 and arm 54 will cause the arm 64 to be moved substantially in a circular arc. When this arm 64 contacts 66, a circuit is completed for control purposes.

Figure 6:
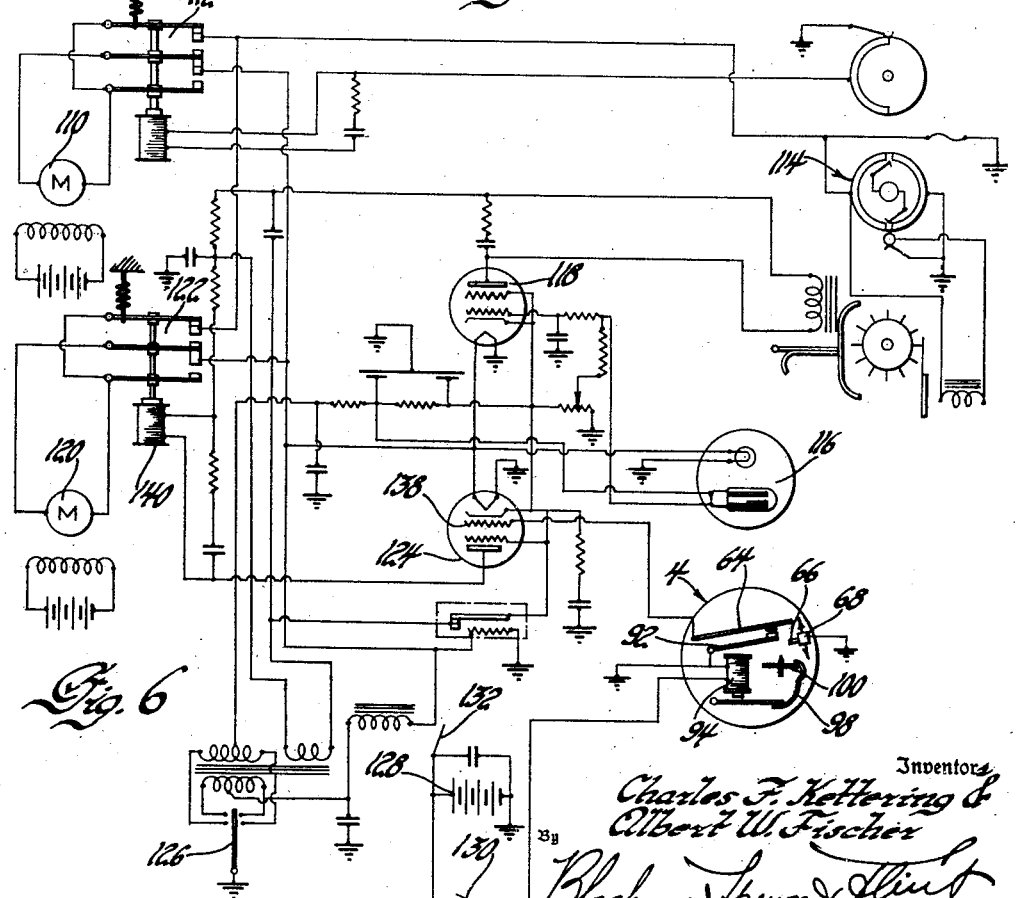
Figure 6 is a schematic wiring diagram of the control system for an automatically-flown plane including our pressure or altimeter-responsive control.

Referring now more specifically to Figure 6, there is shown therein a complete control system for automatically operating an aerial torpedo in which our altimeter control has been incorporated. The motor 110 in the upper left-hand portion of the diagram is adapted to operate the rudder control, and therefore if the reversing switch 112 connected thereto is in one position, the motor 10 will run in one direction, and if the switch is in the opposite position, the motor will run in the opposite direction, thus adjusting the rudder or course of the aircraft. This switch 112 is controlled by a combination gyroscope and compass means, the gyroscope being indicated generally at 114 and the compass at 116, which control the relay 112 through a power amplifier 118. This particular portion of the apparatus forms no part of the subject matter of this application, but is disclosed in a copending application in the names of Kettering and Fischer, Serial No. 453,358, filed August 3, 1942, now abandoned, serving only the purpose of illustrating how applicants' present invention is incorporated therewith to provide automatic control for an aerial torpedo. It will be sufficient in this instance to state that the gyroscope and compass do control the upper relay 112 which in turn controls the rudder motor 110 to direct the course of the aircraft.

In like manner, the altimeter control 4 controls the operation of the elevator servomotor 120 through a reversing switch relay 122 which is controlled through a power amplifier 124. To complete the circuit diagram, a synchronous vibrator 126 and a source of D. C. power 128 provide the supply of power necessary for the various portions. A switch 130 is placed in the main line to the clock or time control means to prevent the same from operating prior to actual taking to the air of the craft and is placed on the bottom of the craft so that the weight thereof keeps this switch open, but as soon as it takes off, the switch is allowed to close. This permits the elevators to be adjusted to a desired position and to remain there until the craft actually takes off. Master switch 132 also cooperates in maintaining the system deenergized until the proper moment.

The object of the device as set forth previously is to control the plane so that it will climb at a definite rate to a preset elevation and then level off for continuous flight at that level or altitude. It is a hunting system as the control motor is at all times operating in one direction or the other as controlled by the biased reversing switch 122.

In operation the knob 76 is first turned until the index mark on traveling nut 68 is opposite zero on scale 77. Knurled knob 86 is then turned to adjust pivoted frame 72 until arm 64 whose position is determined by the aneroid means is just in contact with the pin 66. This is with cam 106 in a position corresponding to horizontal elevator position. This corrects the device to the altitude of the location of operation which may vary considerably. Knob 76 is now turned to adjust the nut 68 to read the altitude above ground level, at which it is desired to have the plane level off, say, for example, 2000 feet. The clock mechanism is next set by pulling out stem 134 and setting arm 92 just out of contact with arm 64. The clock mechanism will not operate inasmuch as interlock 98 is in engagement with wheel 100. The plane is then started and launched and as it takes to the air, switch 130 closes energizing relay 94 and setting the clock in motion. As the plane has had its elevation set at a desired position, it starts to climb, and as it does, pressure in the aneroid is reduced, tending to cause arm 64 to move in a clockwise direction as viewed in Figure 2. If this movement is faster than the movement of the clock arm 92, which is now also moving in the same direction, as it probably will be, as soon as it contacts the latter the circuit through arm 64 will be grounded and conductivity of tube 124 interrupted to deenergize the relay coil in relay 122 and cause the contacts and motor to reverse. This reverse movement of the controls, and therefore of the follow-up means through the cam 106, will cause the arm 64 to be backed away and the contact between arms 64 and 92 to be broken. The ground will be removed from grid 138 of tube 124 and the same may now conduct, energizing the relay coil 140 and again reversing the motor 120. This hunting process will be continued, the clock-operated arm 92 gradually letting the aneroid-operated arm 64 down at a definite determined rate to provide a given rate of climb. When, however, arm 64 has proceeded to a point where it engages the preset pin 66, it no longer can descend but will contact and break with this pin from this time on to maintain the plane at this preset elevation level.

The arm 92 merely proceeds along its course until it engages arm 82 and opens the switch 80, 82 to again deenergize the relay 94 and lock the clock mechanism against further operation.

In this design the problem of inertia of the parts was taken into consideration and it is desired to point out that by mounting the aneroid spring and contact arm below the diaphragm, as above described, the inertia effects thereof due to leveling off or air pockets provides a stabilizing influence on the plane being controlled, whereas if they had been located on top of the diaphragm, our experience indicated that their inertia would increase hunting.

It will thus be evident that we have provided means that may be preset before launching to determine a definite rate of climb of the craft to a given elevation and then maintain it at that level.

We claim:

1. In control means, a base, a pivotally mounted support on said base, pressure-responsive means carried by said support, an arm pivotally mounted on said support effectively coupled to said pressure-responsibe means whereby the latter determines the position of said arm, an adjustable abutment in the path of said pivoted arm to prevent its movement past a desired point, a timed progressively moving abutment in the path of the arm to determine the rate at which it approaches the first-named abutment, said arm and abutments forming switching means, control means actuated by said switching means, and follow-up means driven by said control means to adjust the position of the pivotal base.

2. In means for controlling the elevators of aircraft, power means connected thereto to alter the elevator position, switching means to control the power means, pressure-responsive means to operate the switching means and chronometer means superimposed upon the switching means to dictate the rate of operation of said switching means due to the pressure-responsive means.

3. In means for controlling the elevators of aircraft, power means connected thereto for imparting the necessary corrective movement, compound switching means for controlling the power means comprising three contacts, means for presetting one contact to the desired elevation for level flying, pressure-responsive means connected to a second contact whereby its position will be dependent on the momentary elevation of the plane and chronometric means connected to the third contact located in the path of the pressure responsive contact whereby the third contact's position will be dependent on the time interval elapsed after launching and control the rate at which the second contact approaches the first.

4. In means for controlling aircraft elevators to predetermine the rate of climb and elevation for leveling off, means to move said elevators in either direction, switching means to control the moving means comprising an adjustable stop whose position dictates the ultimate height of level flying, a movable arm cooperating therewith whose position is dependent upon atmospheric pressure adjacent the aircraft and a second movable arm driven at a constant rate in the same direction as the first arm moves upon a reduction in atmospheric pressure to engage the first arm so that the same may not approach the adjustable stop at a rate exceeding that of the second arm and thus control the rate of climb of the aircraft.

5. In means for controlling the rate of climb of an aircraft having elevators, means for driving said elevators in either direction switching means for the driving means including a continuously advancing contact driven at a predetermined rate and a second advancing contact whose position is dependent upon the atmospheric pressure adjacent the aircraft so that the last-named contact will be prevented from movement exceeding the predetermined rate and the aircraft will climb at said rate.

6. In means for controlling the rate of climb of an aircraft having elevators, means for driving said elevators in either direction switching means for the driving means including a continuously advancing contact driven at a predetermined rate and a second advancing contact whose position is dependent upon the atmospheric pressure adjacent the aircraft so that the last-named contact will be prevented from movement exceeding the predetermined rate and the aircraft will climb at said rate and an adjustable contact in the path of movement of the contact whose position is dependent upon atmospheric pressure to detain the source from any movement beyond a given point and thus cause the aircraft to level off at that setting.

7. In means to control the flight of aircraft without manual intervention, elevator means for said aircraft, means to move the same, switching means to control the moving means including a contact whose position is dependent upon the ambient atmospheric pressure, an adjustable contact associated therewith which can be set at a position representing a certain altitude, a support for the first-named contact and its operating means, and means to adjust the position of the support to correct for the atmospheric pressure at the locale of initiating the control.

8. In means for controlling the rate of climb of an aircraft having elevators, means for driving said elevators in either direction switching means for the driving means including a continuously advancing contact driven at a predetermined rate and a second advancing contact whose position is dependent upon the atmospheric pressure adjacent the aircraft so that the last-named contact will be prevented from movement exceeding the predetermined rate and the aircraft will climb at said rate, and means actuated by initial movement of the aircraft to begin the movement of the continuously advancing contact.

9. In means for controlling aircraft having elevators, means for driving said elevators in either direction, switching means for controlling said driving means including a first contact, chronometric means for driving said contact at a given fixed rate, a second movable contact traversing substantially the same path as the first and the first acting as a blocking member for the second so that the speed of the second cannot exceed that of the first, pressure sensitive means for actuating said second contact, supporting means for the pressure sensitive means and second contact and means to adjust the position of the supporting means so that corrections for ambient pressure at point of initiation may be made.

10. In means for controlling aircraft having elevators, means for driving said elevators in either direction, switching means for controlling said driving means including a first contact, chronometric means for driving said contact at a given fixed rate, a second movable contact traversing substantially the same path as the first and the first acting as a blocking member for the second so that the speed of the second cannot exceed that of the first, pressure sensitive means for actuating said second contact, supporting means for the pressure sensitive means and second contact and means to adjust the position of the supporting means so that corrections for ambient pressure at point of initiation may be made, a third contact, means for adjusting the same to a position representing a final altitude for level flight, said third contact lying in the path of movement of the second contact but not the first, and control means actuated by initial movement of the aircraft to start the chronometric means.

CHARLES F. KETTERING.
ALBERT W. FISCHER.

REFERENCES CITED

The following references are of record in the file of this patent:

UNITED STATES PATENTS

| Number | Name | Date |
|---|---|---|
| 1,378,740 | Walkup | May 17, 1921 |
| 2,410,058 | Frische et al. | Oct. 29, 1946 |